(12) United States Patent
Towstopiat et al.

(10) Patent No.: US 9,098,457 B2
(45) Date of Patent: Aug. 4, 2015

(54) VISUALIZING DISASTER RECOVERY PLAN EXECUTION FOR THE CLOUD

(71) Applicant: VMware, Inc., Palo Alto, CA (US)

(72) Inventors: Olga Towstopiat, Saratoga, CA (US); Robert Sullivan, Chelmsford, MA (US); Helen Ann Cunningham, Los Altos Hills, CA (US); Brian Partridge, Brookline, MA (US)

(73) Assignee: VMware, Inc., Palo Alto, CA (US)

( * ) Notice: Subject to any disclaimer, the term of this patent is extended or adjusted under 35 U.S.C. 154(b) by 153 days.

(21) Appl. No.: 14/068,811

(22) Filed: Oct. 31, 2013

(65) Prior Publication Data

US 2015/0121122 A1 Apr. 30, 2015

(51) Int. Cl.
*G06F 11/00* (2006.01)
*G06F 11/14* (2006.01)
*G06F 9/455* (2006.01)
*G06F 11/20* (2006.01)
*G06F 11/32* (2006.01)

(52) U.S. Cl.
CPC ........ *G06F 11/1471* (2013.01); *G06F 9/45533* (2013.01); *G06F 11/2023* (2013.01); *G06F 11/32* (2013.01); *G06F 11/321* (2013.01); *G06F 11/324* (2013.01); *G06F 11/326* (2013.01); *G06F 11/328* (2013.01)

(58) Field of Classification Search
CPC ..... G06F 11/32; G06F 11/321; G06F 11/324; G06F 11/326; G06F 11/328
See application file for complete search history.

(56) References Cited

U.S. PATENT DOCUMENTS

| 7,962,736 | B1 * | 6/2011 | Polyudov ........................ 713/2 |
| 2003/0084383 | A1 * | 5/2003 | Yoshii et al. .................... 714/57 |
| 2004/0221203 | A1 * | 11/2004 | Ruhlen et al. ................... 714/38 |
| 2006/0080571 | A1 * | 4/2006 | Ichinowatari .................... 714/6 |
| 2011/0320403 | A1 * | 12/2011 | O'Krafka et al. ............. 707/620 |
| 2012/0017114 | A1 * | 1/2012 | Timashev et al. ............... 714/15 |
| 2013/0173558 | A1 * | 7/2013 | Whisenant et al. .......... 707/674 |
| 2013/0305102 | A1 * | 11/2013 | Malnati .......................... 714/49 |

\* cited by examiner

*Primary Examiner* — Charles Ehne (57) ABSTRACT

Embodiments visualize the execution of a disaster recovery plan. During a transfer of computing nodes from a source site to a target site, a map user interface (UI) is displayed. The map UI includes a first region corresponding to the geographic location of the source site and a second region corresponding to the geographic location of the target site. An animated progress indicator representing termination of computing nodes at the source site is displayed in the first region. Simultaneously, another animated progress indicator representing initiation of computing nodes at the target site, and further representing a reverse animation of the other animated progress indicator, is displayed in the second region.

20 Claims, 9 Drawing Sheets

VISUALIZING DISASTER RECOVERY PLAN EXECUTION FOR THE CLOUD

BACKGROUND

Some existing disaster recovery systems present the status of computing nodes, such as virtual machines (VMs) or other software applications, in a textual manner. As an example, the execution status of VMs may be presented in an expandable list, with the VMs grouped by the physical hardware that hosts the VMs. Other existing systems present computing node status graphically, by combining all computing nodes being monitored and depicting the proportion of computing nodes corresponding to each of several possible states (e.g., in a pie chart).

Even if such systems provide some relevant status information to an administrator, it is difficult for the administrator to interpret this information in detail or with respect to the geographic location or business function of the computing nodes. The location and business function of computing nodes may be significant, especially in disaster scenarios such as extreme weather events. Further, with some of the existing systems, when a transfer of computing nodes between sites is being performed as part of a disaster recovery operation, the progress of the transfer is not clear to the administrator, adding uncertainty to an already stressful exercise.

SUMMARY

One or more embodiments described herein provide an animated visual representation of a disaster recovery plan as the plan is executed. For example, the transfer of a plurality of virtual machines (VMs) from a source site to a target site may be clearly indicated by termination animations corresponding to the source site and initiation animations corresponding to the target site.

To facilitate disaster recovery plan visualization, embodiments described herein organize computing nodes (e.g., VMs) into groups, such as business units. When a transfer of the computing nodes from a source site to a target site is performed, a map user interface (UI) is displayed. The map UI includes a first region corresponding to the geographic location of the source site and a second region corresponding to the geographic location of the target site.

An animated progress indicator representing termination of each group (e.g., business unit) at the source site is displayed in the first region. Simultaneously, another animated progress indicator representing initiation of each group at the target site, and further representing a reverse animation of the other animated progress indicator, is displayed in the second region.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Embodiments described herein employ a map user interface (UI) to provide visualization of inter-site computing node transfers with respect to the geographic locations of the sites and the business units to which the computing nodes belong. Embodiments are described herein with reference to virtual machines (VMs) but may be practiced with any software application, file system, or other computing node that is transferable from one physical host to another. For example, aspects of the disclosure are operable with tenants of a cloud computing system.

By providing animated progress indicators representing the termination and initiation of computing nodes, embodiments of the disclosure enable a system administrator to quickly ascertain the overall status of one or more disaster recovery plans as they are executed. Further, status may be easily interpreted by business unit, allowing the administrator to monitor the disaster recovery operation in terms that are meaningful to the enterprise.

Accordingly, embodiments described herein reduce the amount of uncertainty, and therefore stress, encountered by a system administrator when executing a disaster recovery plan. Embodiments of the disclosure further enable the display of relevant information, such as weather conditions and/or the time of day, corresponding to the source and target sites. Incorporating such information into the map UI enables the administrator to judiciously execute disaster recovery plans without requiring the administrator to compile information from multiple sources manually.

While described with reference to disaster recovery plans in some embodiments, aspects of the disclosure are operable with other transfers, such as planned migrations.

An exemplary virtualized environment is next described.

Figure 1:
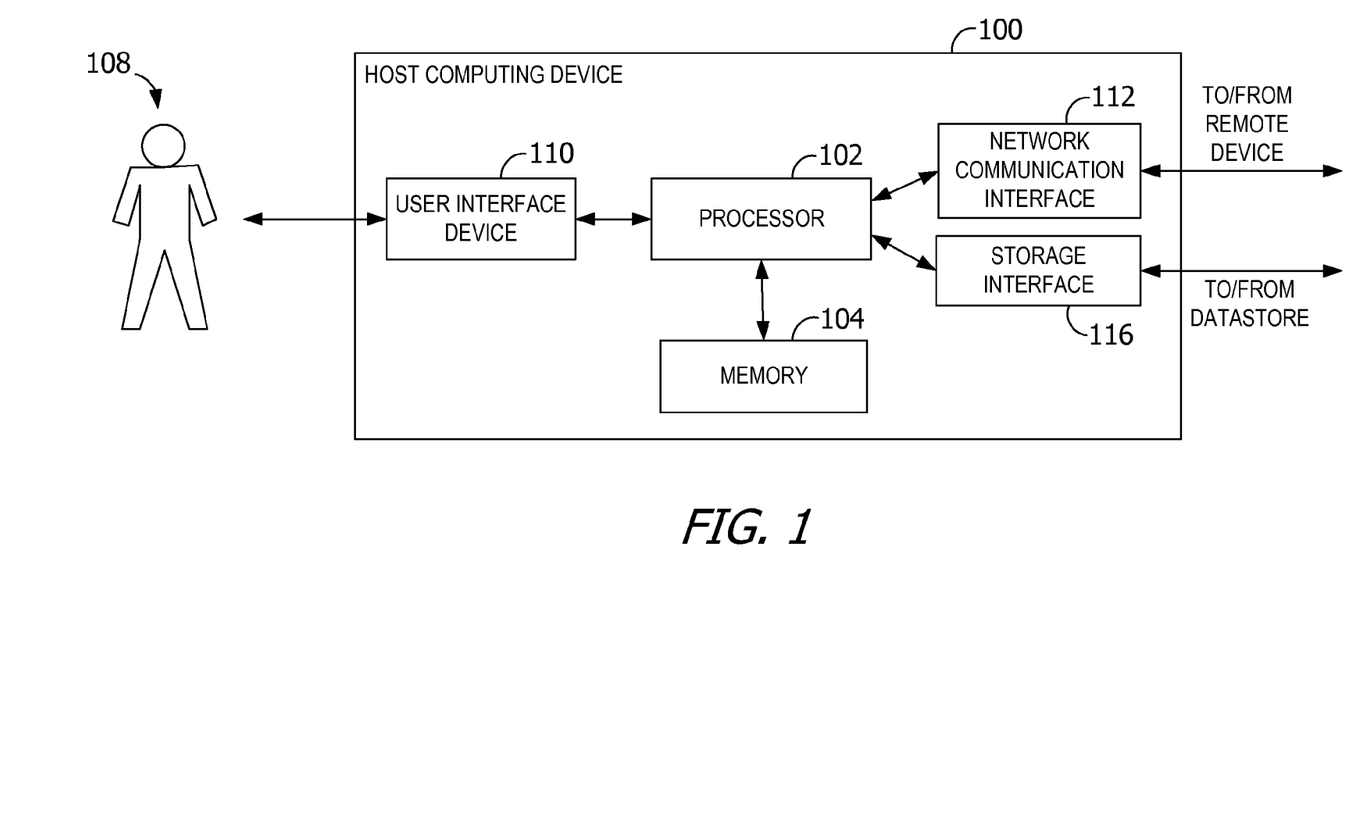
FIG. 1 is a block diagram of an exemplary host computing device.

FIG. 1 is a block diagram of an exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
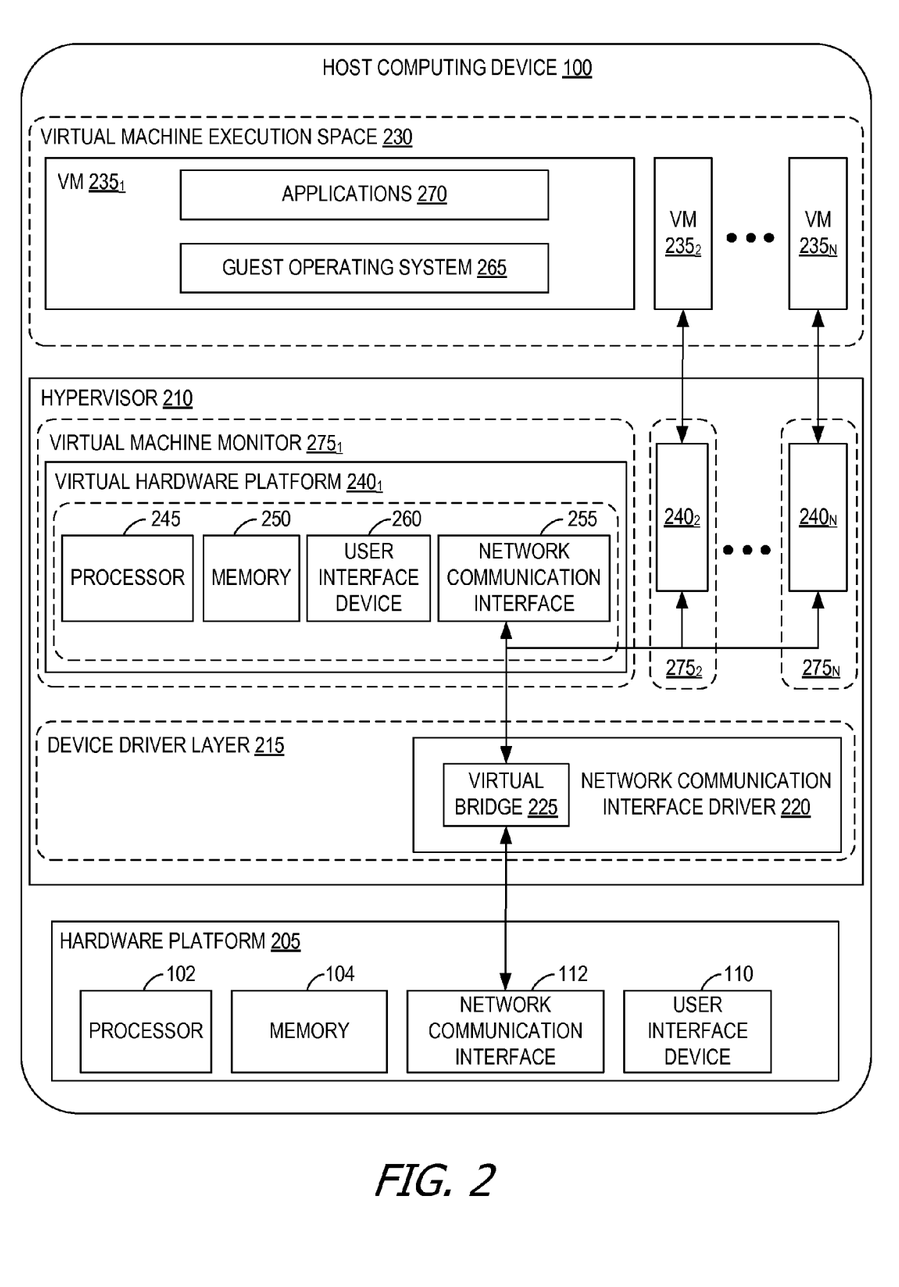
FIG. 2 is a block diagram of virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initiation of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
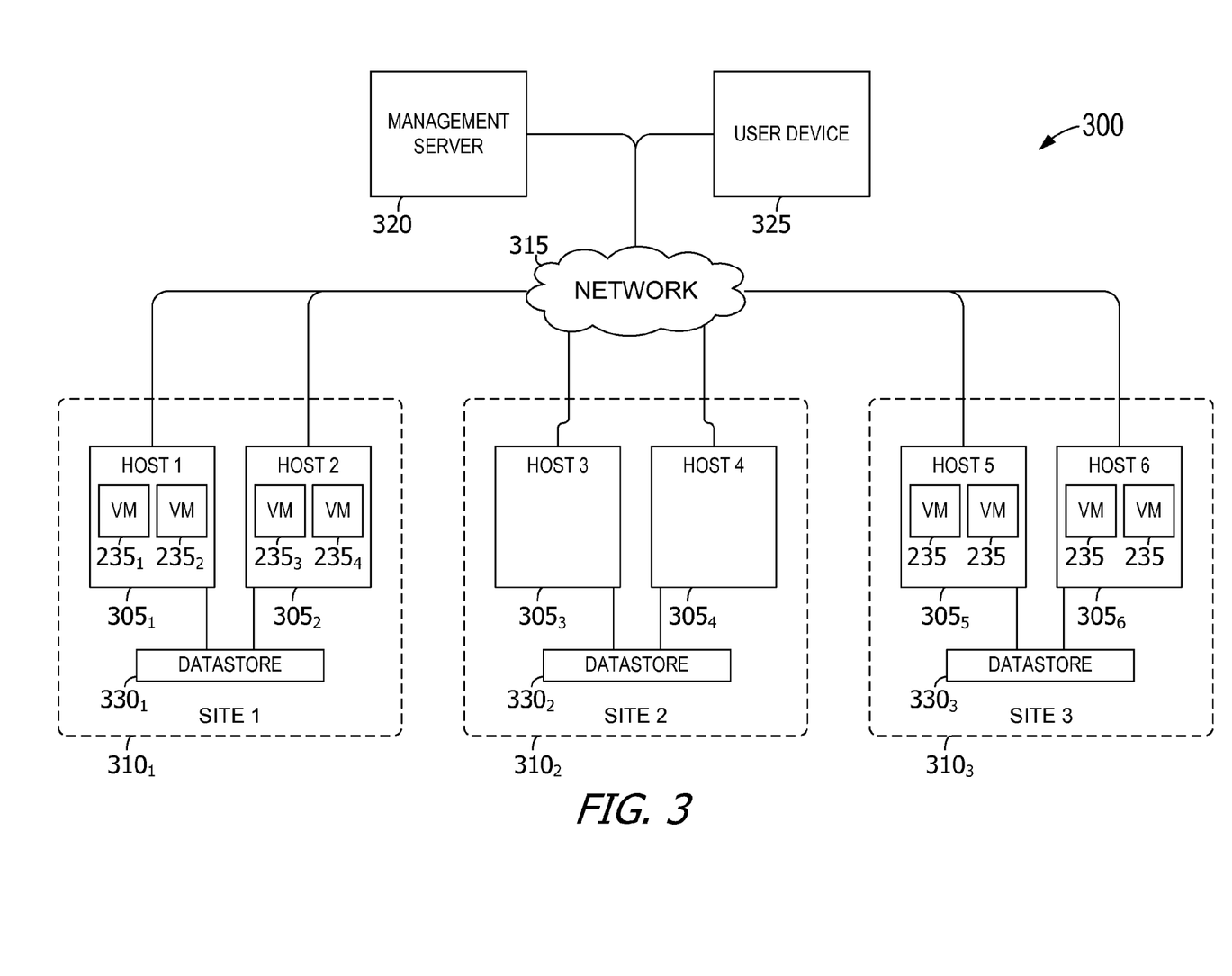
FIG. 3 is a block diagram of a cloud computing system.

FIG. 3 is a block diagram of an exemplary cloud computing system 300 of hosts 305 and virtual machines (VMs) 235. Cloud computing system 300 includes a first site $310_1$, a second site $310_2$, and a third site $310_3$, each associated with a different geographic location. Each site 310 includes a plurality of hosts 305, which are capable of executing one or more computing nodes, such as VMs 235 and/or other software application instances. For example, first host $310_1$ executes first VM $235_1$ and second VM $235_2$, and second host $310_2$ executes third VM $235_3$ and fourth VM $235_4$. It is contemplated that sites 310 may include any quantity of hosts 305 executing any quantity of computing nodes.

Hosts 305 communicate with each other via a network 315. Cloud computing system 300 also includes a management server 320, which communicates with hosts 305 and a user device 325 via network 315. Network 315 represents any means for communication between hosts 305, management server 320, and user device 325. Aspects of the disclosure are operable with any network type or configuration.

In exemplary embodiments, management server 320 monitors and controls hosts 305. For example, management server 320 may, upon receiving a request from a user at user device 325, transfer a VM 235 between hosts 305. Such transfers may be valuable when a particular site 310 is subjected to, or predicted to be subjected to, an operational, communication, and/or staffing hazard. For example, if first site $310_1$ resides in a geographic location in the predicted path of a hurricane, an administrator of cloud computing system 300 may wish to transfer computing nodes from first site $310_1$ to second site $310_2$, where the computing nodes can be executed at lower risk. This transfer may be referred to as a "failover" operation. Further, after the hazard has passed, the administrator may wish to transfer the computing nodes from second site $310_2$ back to first site $310_1$. This transfer may be referred to as a "failback" operation.

Although management server 320 is shown outside sites 310, the functions of management server 320 may be incorporated into one or more of sites 310. For example, management server 320 may be included in a site 310. Alternatively, the functions described with reference to management server 320 may be performed by one or more VMs 235 executed by one or more hosts 305 in a site 310. Hosts 305, management server 320, and user device 325 may be host computing devices 100 (shown in FIG. 1), or any other computing devices capable of performing the functions as described herein.

Referring to FIGS. 1 and 3, computing nodes (e.g., VMs 235) may be stored in memory 104 of hosts 305 and/or in a datastore 330 within the same site 310 in which the computing node is executed. A datastore 330 may include, for example, a storage area network (SAN) and/or network attached storage (NAS), which is accessible by storage interface 116 of a host 305. As shown in FIG. 3, first site $310_1$ includes a first datastore $330_1$, second site $310_2$ includes a second datastore $330_2$, and third site $310_3$ includes a third datastore $330_3$.

In exemplary embodiments, each host 305 provides host information to management server 320. The host information includes, for example, the status (e.g., initiating, executing, terminating, terminated, suspending, or suspended) of computing nodes (e.g., VMs 235) managed by a host 305, computing resources allocated to computing nodes being executed by the host 305, and/or events, such as the initiation, termination, or suspension of a computing node by the host 305. Management server 320 receives the host information from hosts 305 and may provide the host information for presentation to a user at management server 320 and/or user device 325. For example, referring also to FIG. 1, management server 320 may present the host information using a user interface device 110 and/or transmit, using network communication interface 112, the host information to user device 325 or another host computing device 100 for presentation (e.g., using user interface device 110 of user device 325).

In exemplary embodiments, and as described in more detail with reference to FIG. 4, user device 325 implements visualization of disaster recovery plan execution. An administrator of cloud computing system 300, or other user, interacts with user device 325 to define one or more disaster recovery plans, to monitor hosts 235, to execute one or more disaster recovery plans, and/or to monitor the execution of one or more disaster recovery plans. For example, a disaster recovery plan may specify that one or more VMs are to be transferred from one site 310 to another site 310, and may further specify that the VMs 235 are to be transferred in a particular sequence, or in parallel (e.g., simultaneously).

In some embodiments, VMs 235 are grouped by business unit, or business function, within an organization. For example, an organization may manage one or more VMs 235 that perform billing functions and one or more VMs 235 that perform payroll functions. Accordingly, VMs 235 may be associated with a Billing business unit, a Payroll business unit, and/or any other appropriate business unit. Further, some VMs 235 may be associated with a Critical business unit, indicating that the VMs 235 are considered mission critical to the organization. In such embodiments, a disaster recovery plan may specify that one or more business units, including all VMs associated therewith, are to be transferred from one site 310 to another 310, optionally in a particular sequence and/or in parallel.

A disaster recovery plan may include a master recovery plan that, in turn, includes one or more individual recovery plans. For example, a first individual recovery plan may specify that some, or all, computing nodes and/or business units at first site $310_1$ are to be transferred to second site $310_2$. A second individual recovery plan may specify that some other computing nodes or business units at first site $310_1$ are to be transferred to third site $310_3$. Alternatively, or in addition, the second individual recovery plan may specify that some, or all, computing nodes and/or business units at third site $310_3$ are to be transferred to second site $310_2$. A master recovery plan may specify that one or more individual recovery plans are to be executed in a particular sequence and/or in parallel. Disaster recovery plans (e.g., master and/or individual recover plans), business units, and/or associations between VMs 235 and business units, may be stored by management server 320 and/or by user device 325.

Processor 102 of user device 325 is programmed to execute computer-executable instructions for implementing aspects of the disclosure. The instructions may be performed by processor 102 or by multiple processors executing within user device 325, or performed by a processor external to user device 325. In some embodiments, processor 102 of user device 325 is programmed to execute instructions such as those illustrated in the figures to implement visualization of disaster recovery plan execution.

Figure 4:
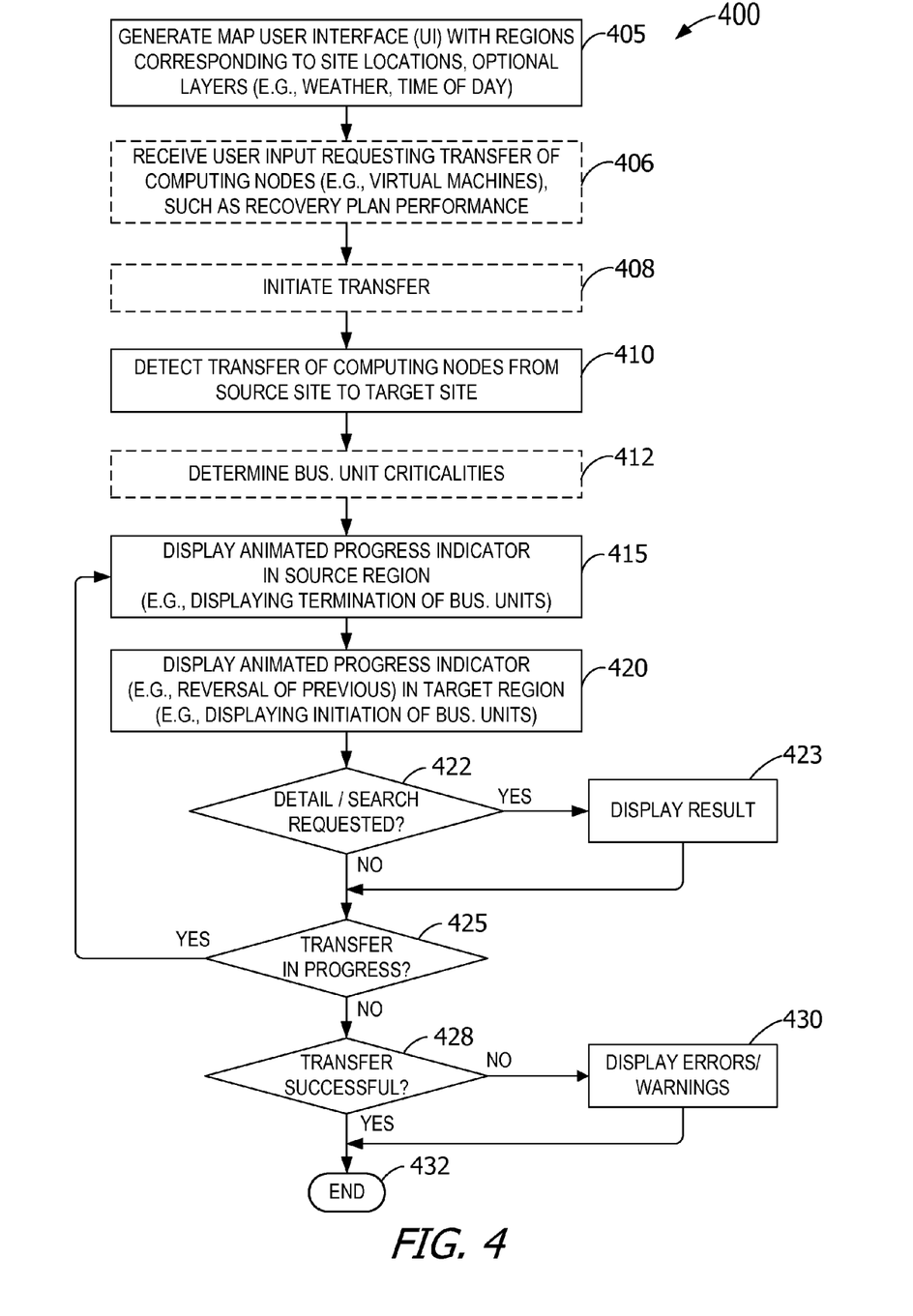
FIG. 4 is a flowchart of an exemplary method performed by a user device to visualize execution of a disaster recovery plan by the cloud computing system shown in FIG. 3.

FIG. 4 is a flowchart of an exemplary method 400 performed by user device 325 to visualize disaster recovery plan execution. While method 400 is described with reference to execution by user device 325 (shown in FIG. 3), it is contemplated that method 400 may be performed by any computing device. For example, map user interfaces and/or animated progress indicators, described below with reference to FIGS. 5, 6, and 7, may be generated at least partially by management server 320 and transmitted by management server 320 (shown in FIG. 3) to user device 325 for display to a user.

Figure 5:
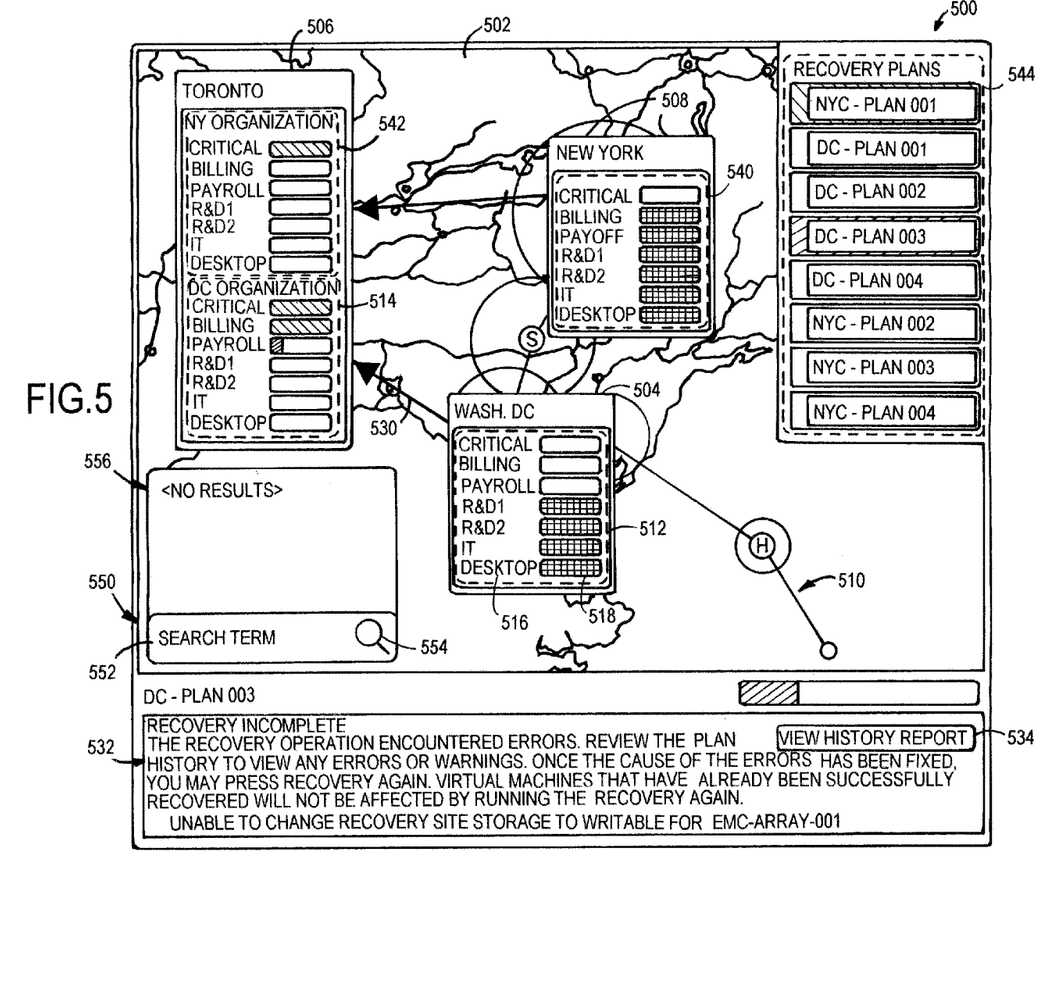
FIG. 5 is an exemplary map user interface for displaying disaster recovery plan execution by the cloud computing system shown in FIG. 3.

FIG. 5 is an exemplary map user interface (UI) 500 for displaying disaster recovery plan execution by cloud computing system 300 (shown in FIG. 3). Referring to FIGS. 3, 4, and 5, user device 325 generates at 405 map UI 500 for presentation to a user. Map UI 500 includes a map 502 of a geographic area that includes one or more sites 310 in which computing nodes (e.g., VMs 235) may be executed. The organization managing cloud computing system 300 includes a plurality of business units, and each computing node may be associated with one or more of these business units. Map UI 500 also includes a first region 504 corresponding to the geographic location of first site $310_1$, a second region 506 corresponding to the geographic location of the second site $310_2$, and a third region 508 corresponding to the geographic location of the third site $310_3$.

In some embodiments, map UI 500 includes additional information corresponding to various regions within map 502, such as weather conditions, time zones, and/or the time of day, overlaid on map 502. For example, such information may be displayed as selectable layers over map 502. In FIG. 5, map UI 500 is shown with a weather condition layer 510 representing a predicted path of a hurricane.

User device 325 detects at 410 a transfer of one or more computing nodes in a datacenter from a source site (e.g., first site $310_1$) to a target site (e.g., second site $310_2$). The detected transfer may include a transfer of individual computing nodes, a transfer of one or more business units, and/or an execution of a disaster recovery plan that results in the transfer of multiple business units and the computing nodes associated therewith.

In some embodiments, user device 325 detects at 410 the transfer by receiving a notification of the transfer from management server 320. In addition, or alternatively, user device 325 may detect at 410 the transfer by receiving at 406 user input requesting the transfer of the computing nodes from the source site to the target site, and initiating at 408 the transfer (e.g., by requesting that management server 320 perform the transfer) based on the user input. The user input may include, for example, movement of an icon representing a VM 235 or business unit from the source site to the target site (e.g., as a drag-and-drop gesture) and/or selection of a disaster recovery plan to execute.

During performance of the transfer, user device 325 displays at 415 a first animated progress indicator 512 in first region 504 representing termination of one or more computing nodes at first site $310_1$. User device 325 also displays at 420, simultaneous to the display of first animated progress indicator 512, a second animated progress indicator 514 in second region 506 representing initiation of the computing nodes at second site $310_2$. Second animated progress indicator 514 further represents a reverse animation of first animated progress indicator 512. For example, as data corresponding to a computing node is transmitted from first site $310_1$ to second site $310_2$, first animated progress indicator 512 may diminish (e.g., in size, transparency, etc.) while second animated progress indicator 514 grows or otherwise increases (e.g., in size, transparency, etc.).

The animated progress indicators 512, 514 shown in FIG. 5 may be referred to as rectilinear progress indicators. Each rectilinear progress indicator includes a row representing each business unit 516 being transferred to or from the site to which the rectilinear progress indicator corresponds. Beside each business unit 516 is a progress bar 518 indicating the progress made thus far in terminating (if the corresponding site is a source site), or initiating (if the corresponding site is a target site), the computing nodes associated with the business unit 516.

In exemplary embodiments, a progress bar 518 corresponding to a source site is initially displayed in a full, or 100%, state. As computing nodes within the associated business unit are terminated, the progress bar is updated to indicate less than 100% (e.g., corresponding to the percentage or quantity of computing nodes that are terminated). When all computing nodes within the business unit 516 have been terminated, the progress bar 518 indicates an empty, or 0%, state. Conversely, a progress bar 518 corresponding to a target site is initially displayed in an empty, or 0%, state. As computing nodes within the associated business unit are initiated, the progress bar is updated to indicate more than 0% (e.g., corresponding to the percentage or quantity of computing nodes that are initiated). When all computing nodes within the business unit 516 have been initiated, the progress bar 518 indicates a full, or 100%, state. Accordingly, the animation at a target site may be understood as a reverse of the animation at a source site.

User device 325 may also display in map UI 500 a directional arrow 530 from the geographic location of the source site to the geographic location of the target site. User device 325 continues displaying at 415 first animated progress indicator 512 and displaying at 420 second animated progress indicator 514, updating the indicated progress, as long as user device 325 determines at 425 that the transfer is still in progress.

When user device 325 determines at 425 that the transfer is no longer in progress, if the transfer is determined at 428 to be not completely successful (e.g., one or more errors or warnings have been reported by management server 320), user device 325 displays at 430 the errors and/or warnings encountered during the transfer. For example, user device 325 may display at 430 an error message 532 in map UI 500 describing an error reported by management server 320 with respect to the transfer. In addition, or alternatively, user device 320 may graphically distinguish first animated progress indicator 512, second animated progress indicator 514, and/or directional arrow 530 to indicate the occurrence of an error. Graphical distinction may be accomplished using an icon, a text color, a text weight, a line color, a line weight, a background pattern, a background color, an animation, and/or any other method of visually differentiating user interface elements from one another.

In some embodiments, different colors may be used to convey different status, and are represented in FIG. 5 by different crosshatch patterns. For example, a green color may show the recovery steps that have completed (e.g., which VMs 235 are powered on and running at the destination recovery site) and/or a first individual recovery plan (e.g., "NYC—Plan 001" within recovery plans 544) that has been successfully completed. Green may also be used for the arrow from "New York" to "Toronto" to indicate such successful completion. A gray color may illustrate VMs 235 that have shut down at the source sites (e.g., "Critical", "Billing", and "Payroll" in Washington, D.C., and "Critical" in New York). A blue color may illustrate VMs 235 that are still running at the source sites (e.g., "R&D 1", "R&D 2", "IT", and "Desktop" in Washington, D.C., and "Billing", "Payroll", "R&D 1", "R&D 2", "IT", and "Desktop" in New York). A red color may show that a fourth individual recovery plan (e.g., "DC—Plan 003" within recovery plans 544) encountered an error and did not complete all the recovery steps. Red may also be used for the arrow from "Washington, D.C." to "Toronto" to indicate existence of the error. A red color may also appear in a horizontal progress bar to illustrate that an error occurred at a specific point within the fourth individual recovery plan (e.g., "DC—Plan 003"). A red error icon may also be shown in the error message, along with a red error badge in the recovery icon to illustrate "Recovery Incomplete" within the error message.

In addition to error message 532, map UI 500 may include a history report button 534. In response to selection of history report button 534, user device 325 displays a history report including detailed log generated during the transfer process. The history report provides information that is helpful in troubleshooting errors.

When user device 325 determines at 428 that the transfer was successful, processing according to FIG. 4 concludes at 432.

Although it is computing nodes (e.g., VMs 235) that are being transferred between sites, user device 325 may group the computing nodes by business unit within animated progress indicators 512, 514. Such grouping simplifies the presentation of transfer progress and may improve interpretation of map UI 500 by a user. For example, rather than representing the termination of individual VMs 235, of which there may be many, first animated progress indicator 512 represents termination of the VMs 235 associated with each business unit. Similarly, second animated progress indicator 514 represents initiation of the VMs 235 associated with each business unit.

In some embodiments, a termination sequence is defined, either by a user, or by a computing device (e.g., management server 320 or user device 325) based on priorities associated with the business units and/or based on dependencies defined between the business units. As an example, business units may be positioned in the termination sequence in descending order of priority, such that low priority business units are terminated and transferred after high priority business units are terminated and transferred. As another example, a payroll business unit may be dependent on accounting and time keeping business units. In this example, the accounting and time keeping business units may positioned after the payroll business unit in the termination sequence, such that no business unit is executed while a business unit on which it depends has been terminated.

If a termination sequence is defined, user device 325 may display at 415 first animated progress indicator 512 to display termination of each of the plurality of business units according to the termination sequence, and display at 420 second animated progress indicator 514 to display initiation of each of the plurality of business units according to a reversal of the termination sequence. For example, user device 325 may sort business units within first animated progress indicator 512 by their corresponding positions in the termination sequence, and sort business units in second animated progress indicator 514 by their corresponding positions in the reversal of the termination sequence.

In some embodiments, user device 325 determines at 412 a criticality of each of the business units. For example, user device 325 may determine the criticality of a business unit based on one or more performance metrics (e.g., concurrent users, storage utilization, and/or CPU utilization) associated with the computing nodes within the business unit. Such performance metrics may be computed by hosts 305 that execute the computing nodes and compiled by management server 320, which manages hosts 305. In such embodiments, when displaying at 415 first animated progress indicator 512 and displaying at 420 second animated progress indicator 514, user device 325 graphically distinguishes the business units based on the determined criticalities. Graphical distinction may be accomplished using an icon, a text color, a text weight, a line color, a line weight, a background pattern, a background color, an animation, and/or any other method of visually differentiating user interface elements from one another.

In some embodiments, the transfer of computing nodes detected at 410 by user device 325 is part of the execution of a master recovery plan by management server 320. The master recovery plan includes a plurality of individual recovery plans, optionally in a specific order. When the master recovery plan specifies that multiple individual recovery plans, each indicating a transfer of computing nodes from first site $310_1$, are to be performed in parallel, user device 325 displays at 415 first animated progress indicator 512 to display performance of the individual recovery plans in parallel. When the master recovery plan specifies that multiple individual recovery plans, each indicating a transfer of computing nodes from first site $310_1$, are to be performed in sequence, user device 325 displays at 415 first animated progress indicator 512 to display performance of the individual recovery plans in sequence.

As another example, a master recovery plan may include one individual recovery plan specifying that computing nodes from first site $310_1$ are to be transferred to second site $310_2$, and another individual recovery plan specifying that computing nodes form third site $310_3$ are to be transferred to second site $310_2$. In this scenario, user device 320 detects at 410 the transfer(s) resulting from each individual recovery plan. Representing execution of the first recovery plan, user device 325 displays at 415 animated progress indicator 512 in first region 504, which corresponds to the source (first site $310_1$), and displays at 420 animated progress indicator 514 in second region 506, which corresponds to the target (second site $310_2$). Representing execution of the second recovery plan, user device 325 displays at 415 an animated progress indicator 540 in third region 508, which corresponds to the source (third site $310_3$) and displays at 420 another animated progress indicator 542 in second region 506, which corresponds to the target.

In some embodiments, map UI 500 includes a recovery plan list 544 including the available disaster recovery plans and/or the individual recovery plans included in a master recovery plan that is being executed. Further, user device 325 may graphically distinguish recovery plans in recovery plan list 544 based on the status of the recovery plan (e.g., executing, not executing, and/or error encountered).

After the transfer of computing nodes from a source site to a target site is complete, another transfer may be executed to move the computing nodes back to the original source site. For example, when the hazard that motivated the original transfer has passed, an administrator may wish to restore the computing nodes to the previous allocation in a failback operation. As another example, if a new hazard that affects the original target site is considered sufficiently serious, the administrator may transfer the computing nodes away from the original target site (e.g., to the original source site) in a failover operation. In such scenarios, user device 325 detects at 410 a reversed transfer of computing nodes from the target site to the source site resulting from a failover operation and/or a failback operation. User device 325 updates first animated progress indicator 512 and second animated progress indicator 514 to reflect the new direction of the transfer. Further, if map UI 500 includes directional arrow 530, user device 325 reverses the direction of directional arrow 530 in response to the reversed transfer.

As described above, the rectilinear progress indicators provided by map UI 500 provide an easily analyzed interface that enables at-a-glance assessment of disaster recovery plan execution. The one-to-one correspondence between a terminating business unit at a source site and an initiating business unit at a target site is intuitively understood by users, reducing the effort required to interpret system status. Further, because such rectilinear progress indicators prominently feature business units, a user may quickly determine which business units have been successfully transferred, which are being transferred, and which have yet to begin a transfer, providing a simplified view of critical computing node status.

In some embodiments, user device 325 includes a search feature and/or detailed information about computing node transfers. For example, a user may select (e.g., using a mouse cursor and/or a touch screen) a business unit within first animated progress indicator 512. In response to receiving this user input, user device 325 determines at 422 that the user has requested detailed information regarding the detected transfer with respect to the selected business unit and displays at 423 the requested information within map UI 500, as described with reference to FIG. 6.

Figure 6:
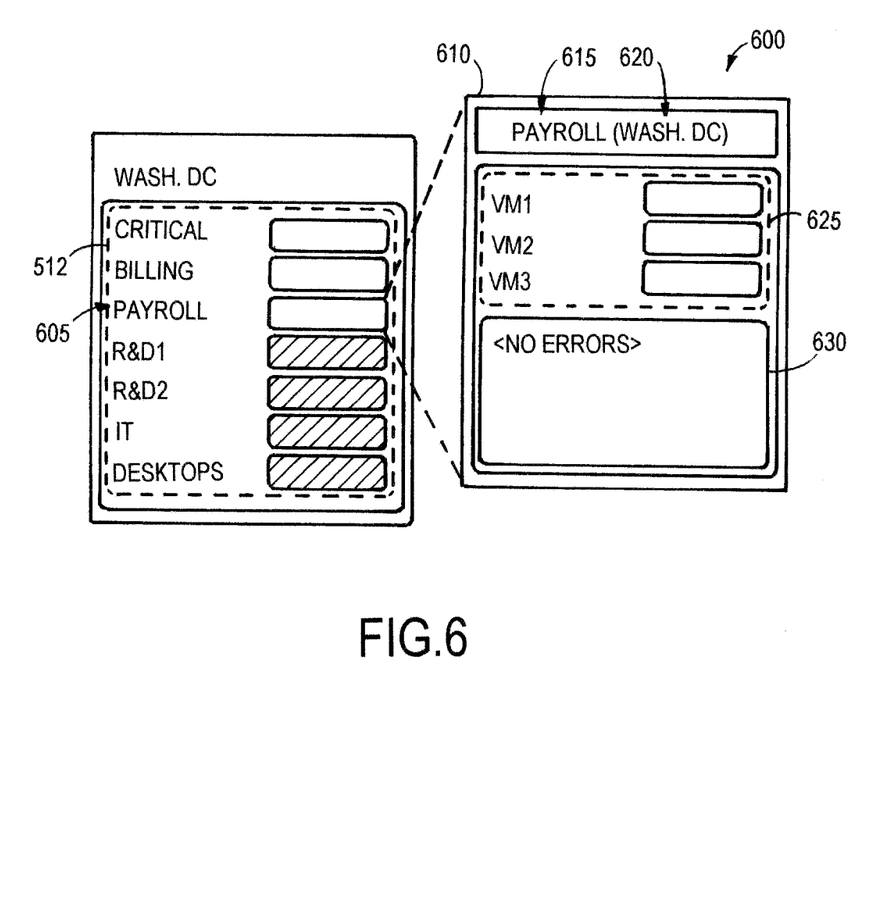
FIG. 6 is an exemplary user interface for displaying detailed information regarding transfer of a business unit.

FIG. 6 is an exemplary UI 600 for displaying detailed information regarding transfer of a business unit. Referring to FIGS. 3, 4, 5, and 6, the user has selected a business unit 605 within first animated progress indicator 512, indicating a request for detailed information regarding the transfer of business unit 605. In response to the user input, user device 325 displays at 423 a detailed information panel 610 associated with selected business unit 605.

Detailed information panel 610 includes the name 615 of business unit 605 and the name 620 of first site $310_1$, in which the user made the selection. Because first site $310_1$ is the source site from which business unit is being transferred, user device 325 displays at 423 within detailed information panel 610 an animated progress indicator 625 representing termination of each of the computing nodes associated with selected business unit 605. If the user had instead selected the business unit 605 within the target site (second site $310_2$), user device 3235 would display animated progress indicator 625 representing initiation of each of the computing nodes associated with business unit 605. User device 325 updates animated progress indicator 625 in a manner similar to that used to update first animated progress indicator 512. However, user device 325 updates animated progress indicator 625 with respect to each individual computing node, rather than aggregating the progress of all computing nodes within a business unit. Detailed information panel 610 may also include an error panel 630. Error panel 630 includes any errors reported during termination or initiation of business unit 605.

Incorporating UI 600 into map UI 500, computing node transfers may be summarized by business unit by default, and displayed in detail when desired. Accordingly, the user may select the amount of information shown, avoiding the problem of overwhelming map UI 500 with unwanted detail.

In some embodiments, map UI 500 includes a search UI element 550 including a search term box 552, by which user device 325 can receive a search term from the user, and a search button 554. User device 325 determines at 422 that the user has requested a search (e.g., by selecting search button 552) and, in response to the received request, user device 325 displays at 423 any business units, and/or computing nodes matching the search term. Search terms may include, for example, an identifier (e.g., a name), one or more map coordinates, a street address, a postal code, and/or any portion thereof.

As an example, if the search term represents at least a portion of an identifier (e.g., a name) of a computing node within cloud computing system 300, user device 325 may display at 423 the matching computing node(s) within map UI 500, optionally including the current status of the computing node. For example, user device 325 may display at 423 a matching computing node by displaying a detailed information panel 610 corresponding to any site 310 in which the matching computing node exists, or by displaying the matching computing node by itself in a region corresponding to a geographic location associated with the matching node. Alternatively, or in addition, user device 325 may display at 423 the matching computing node(s) in a search results region 556 of UI 500 that does not correspond to the geographic location of any computing node. This approach may be beneficial when multiple matching computing nodes are found for an entered search term. In some embodiments, user device 325 graphically distinguishes matching business units and/or computing nodes within map UI 500.

Additional Examples

The following scenarios are merely exemplary and not intended to be limiting in any way.

Figure 7:
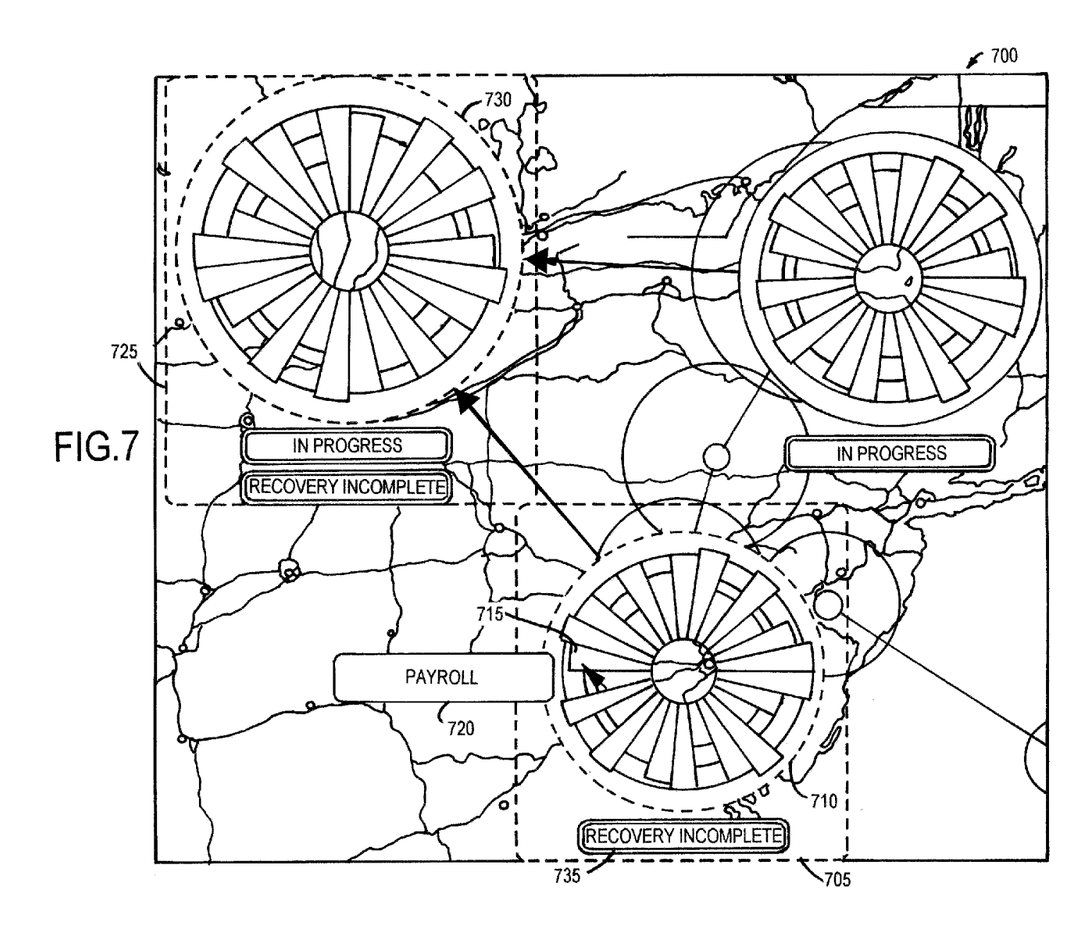
FIG. 7 is an exemplary map user interface that includes radial animated progress indicators.

As described above, the progress of computing node transfers may be indicated by rectilinear progress indicators, optionally grouped by business units associated with the computing nodes. In some embodiments, the status of such transfers is instead indicated by radial progress indicators. FIG. 7 is an exemplary map UI 700 that includes radial animated progress indicators. Referring to FIGS. 3 and 7, within a first region 705 corresponding to first site $310_1$, a first radial progress indicator 710 is displayed. First radial progress indicator 710 includes a spoke 715 representing each business unit being transferred from first site $310_1$. Alternatively, each spoke 715 may represent a unit of protection in a disaster recovery scheme, a tier within a computing infrastructure, a step within a recovery plan, a protection group, a priority group, and/or any unit that is meaningful to a system administrator. Spokes may be graphically distinguished from each other based on criticality, as described above with reference to Map UI 500 (shown in FIG. 5). Further, the unit (e.g., business unit or recovery step), represented by spoke 715, the criticality thereof, and/or other corresponding information, may be displayed when the user selects and/or hovers a pointer over spoke 715. For example, map UI 700 includes a spoke label 720 indicating that the spoke 715 represents the Payroll business unit. In addition, or alternatively, detailed information regarding the unit represented by spoke 715 may be displayed when spoke 715 is selected (e.g., clicked), as described with reference to FIG. 6.

Map UI 700 also includes a second region 725 corresponding to second site $310_2$, in which a second radial progress indicator 730 is displayed. In some embodiments, prior to initiating computing node transfers, second radial progress indicator 730 (at the target site) is displayed as an empty white circle with gray spokes; first radial progress indicator 710 (at the source site) is displayed with completely filled blue spokes representing each of the steps for terminating first site $310_1$ and representing executing computing nodes. During the transfer from first site $310_1$ to second site $310_2$, a disaster recovery, the blue spokes in first radial progress indicator 710 diminish and/or fade away as first site $310_1$ completes the termination steps. Simultaneously, as computing nodes at first site $310_1$ are terminated, second radial progress indicator 730 displays spokes that correspond to the spokes in first radial progress indicator 710. The spokes of second radial progress indicator 730 grow (e.g., are filled with blue color) as recovery steps are completed and computing nodes are initiated. First region 705 also includes a status label 735 describing the recovery step currently being executed at first site $310_1$. If any errors are encountered while transferring computing nodes from first site $310_1$, status label 735 may display these errors.

The radial progress indicators provided by map UI 700 may be used to represent dozens of datacenter source and recovery sites across the world without excessive visual clutter, and provide visual graphical confirmation that the mappings from all the source sites to the destination recovery sites are up to date and ready for a bi-directional recovery. Conversely, the high-level map view provided by map UI 700 also illustrates graphically if any source site to destination recovery site mappings are broken and require a configuration change.

Figure 8:
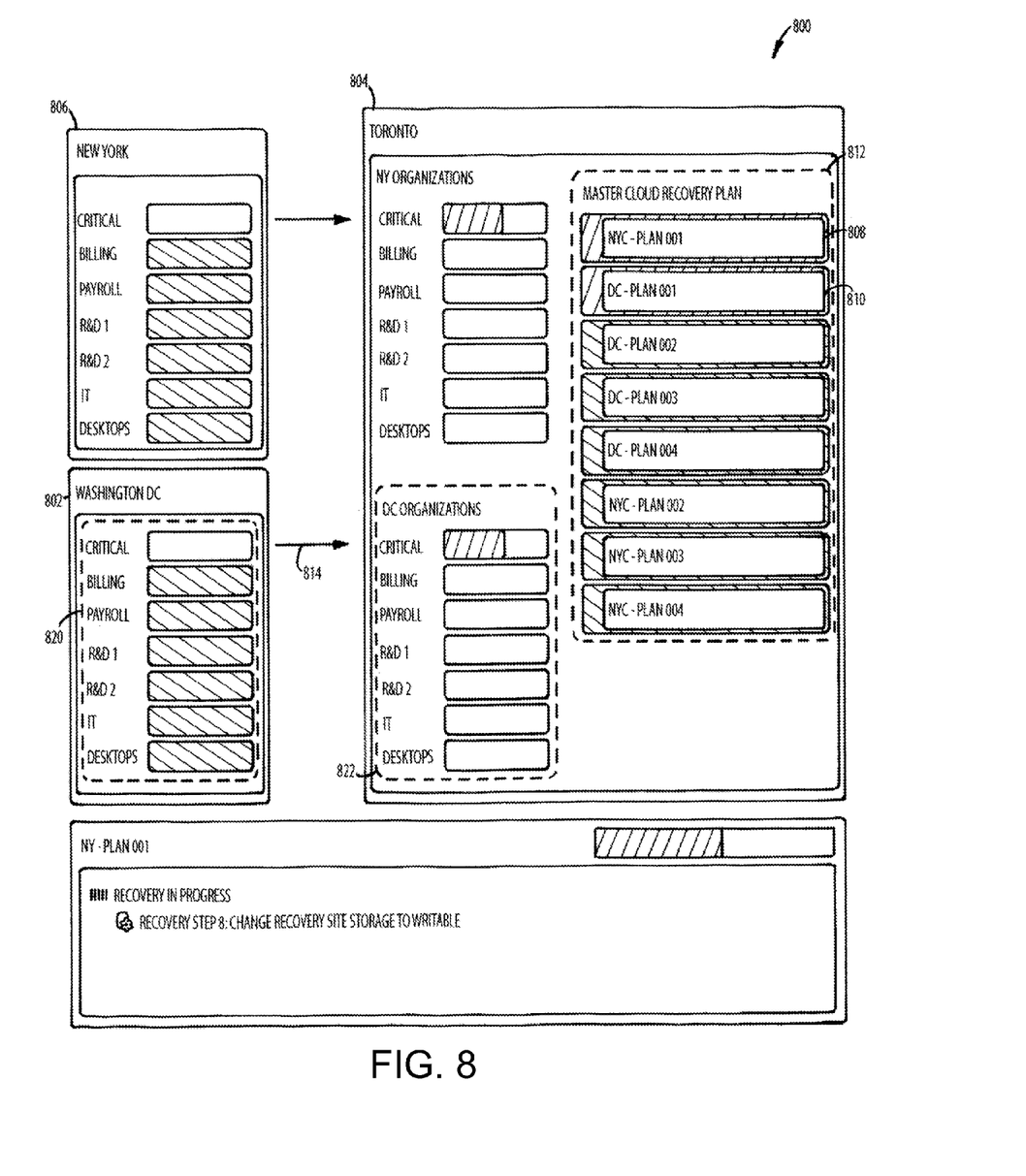
FIG. 8 is a disaster recovery progress user interface that may be presented individually and/or integrated with a map user interface, such as that shown in FIG. 5.

FIG. 8 is a disaster recovery (DR) progress UI 800 that may be presented individually and/or integrated with a map UI (e.g., map UI 500, shown in FIG. 5). Referring to FIGS. 3 and 8, DR progress UI 800 includes a first region 802 corresponding to first site $310_1$, a second region 804 corresponding to second site $310_2$, and a third region 806 corresponding to third site $310_3$. In the scenario depicted, two recovery plans are being executed: a first recovery plan 808 specifying a transfer of computing nodes (e.g., VMs 235) from first site $310_1$ to second site $310_2$, and a second recovery plan 810 specifying a transfer of computing nodes from third site $310_3$ to second site $310_2$. Accordingly, both first site $310_1$ and second site $310_2$ are source sites, and third site $310_3$ is a target site.

In DR progress UI 800, recovery plans are displayed in a recovery plan list 812 and are graphically distinguished from each other based on status (e.g., executing, idle, and failed). For example, first recovery plan 808 and second recovery plan 810, which are being executed, may be displayed in a different color from recovery plans that are currently not being executed.

Using DR progress UI 800 as a disaster recovery is in progress, an administrator can monitor visually multiple recovery plans (e.g., first recovery plan 808 and second recovery plan 810) as the recovery plans simultaneously terminate two source sites (first site $310_1$ and second site $310_2$) and initiate a destination recovery site (third site $310_3$).

As shown in FIG. 8, each source site contains seven units and is associated with four recovery plans, each of which specifies the transfer of one or two business units to the target site. A master recovery plan specifies the execution of the individual recovery plans, including the sequence of the individual recovery plans, and whether the individual recovery plans are to be executed in sequence and/or in parallel. Based on the execution of the recovery plans, computing nodes at both source sites terminate sequentially and/or in parallel, and then the computing nodes at the target site initiate sequentially and/or in parallel. As the recovery plans are executed, DR progress UI 800 is updated to indicate the status (e.g., waiting, executing, complete, and/or failed) of steps within the recovery plans. For example, the termination and/or initiation of each computing node and/or business unit may be considered a step in a recovery plan.

In the example of FIG. 8, a master recovery plan is executed to transfer computing nodes from two source sites to a target site due to an approaching hurricane. Before, and/or as, the individual recovery plans are executed, a first animated (e.g., pulsing) directional arrow 814 is displayed in DR progress UI 800 to indicate that computing node mappings between first site $310_1$ and second site $310_2$ are complete and updated, and that the direction of the transfer is from first site $310_1$ to second site $310_2$. In addition, a ready icon, such as a green checkmark icon, may be displayed to indicate that disaster recovery configuration is updated at both the source and target site, and that the recovery plan corresponding to the source site and target site is ready to be executed.

First region 802 includes a first animated progress indicator 820 that represents termination of computing nodes at first site $310_1$. Within first animated progress indicator 820, business units are listed in the same sequence specified by the master recovery plan and/or individual recovery plan than specifies their transfer. For example, business units listed at the top of first animated progress indicator 820 may be considered critical business units, which are terminated, transferred, and initiated prior to the termination, transfer, and initiation of other business units. Similarly, second region 804 includes a second animated progress indicator 822 that lists the same business units listed by first animated progress indicator 820, and in the same sequence. For example, the most critical business units may be displayed at the top of second animated progress indicator 822.

As execution of a recovery plan occurs, each progress bar corresponding to the source site (e.g., within first animated progress indicator 820) diminishes from a full state to an empty state to indicate the termination of computing nodes within the business unit corresponding to the progress bar. Next, for each business unit, the corresponding progress bar corresponding to the target site (e.g., within second animated progress indicator 822) grows from an empty state to a full state to indicate the initiation of computing nodes within the business unit. Accordingly, an administrator can see "at a glance" which business unit's recovery is currently in progress by quickly identifying which business unit corresponds to an empty progress bar in first animated progress indicator 820, and to a growing progress bar in second animated progress indicator 822.

In some embodiments, the methods described herein may be used to monitor an execution of one or more disaster recovery plans, as described above, and/or to monitor a test of one or more disaster recovery plans. Testing a recovery plan is similar to executing the recovery plan, but one or more steps, such as terminating the computing nodes at the source site, may be omitted. In such embodiments, DR progress UI 800 may graphically distinguish a recovery plan test from a recovery plan execution. For example, graphical elements (e.g., directional arrow 814 and/or second animated progress indicator 822) within DR progress UI 800 may be displayed in a unique color when a recovery plan is being tested.

Figure 9:
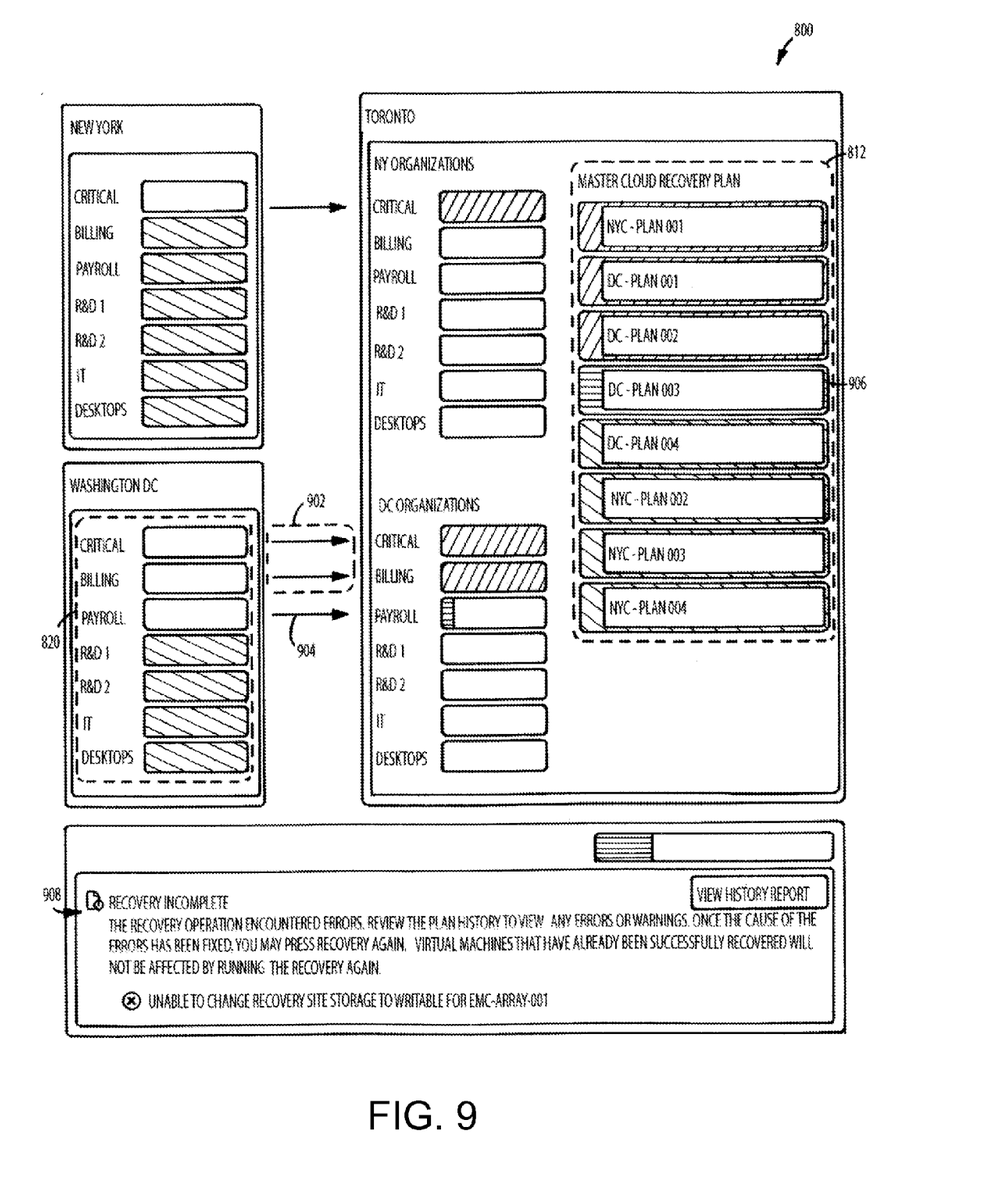
FIG. 9 is the disaster recovery progress user interface shown in FIG. 8 indicating the status of steps in a disaster recovery plan.

FIG. 9 is DR progress UI 800 (shown in FIG. 8) indicating the status of steps in a disaster recovery plan. As shown in FIG. 9, successful transfer arrows 902 indicate that two business units have been successfully transferred from a source site to a target site. A failed transfer arrow 904 indicates that an error occurred during the transfer of another business unit from the source site to the target site, and a recovery plan 906 corresponding to the failed transfer is graphically distinguished from waiting and completed recovery plans in recovery plan list 812. In addition, an error message 908 describes the error that occurred during the transfer of the business unit indicated by failed transfer arrow 904.

Also, in FIG. 9, information about the running recovery plans may be shown below the main visualization display using a split screen, which can be modified to show more or less of the graphical or textual information.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. Computer storage media exclude propagating signals. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A computing device for monitoring and troubleshooting disaster recovery for a datacenter, said computing device comprising:

a display;

a memory area storing a master recovery plan, the master recovery plan identifying a plurality of business units in the datacenter, each of the business units executing a plurality of virtual machines (VMs); and a processor programmed to generate a map user interface (UI) on the display during performance of the master recovery plan stored in the memory area, the map UI including:

a first region for displaying a first animated progress indicator representing termination of each of the plurality of business units at a source site, the first region corresponding to a geographic location of the source site in the map UI; and a second region for displaying, simultaneous to the display of the first animated progress indicator, a second animated progress indicator representing initiation of each of the plurality of business units at a target site, the second region corresponding to a geographic location of the target site in the map UI, the second animated progress indicator further representing a reverse animation of the first animated progress indicator.

2. The computing device of claim 1, wherein the processor is further programmed to generate the map UI by animating the first progress indicator to display termination of the VMs associated with each of the plurality of business units.

3. The computing device of claim 1, wherein the processor is further programmed to generate the map UI by animating the second progress indicator to display initiation of the VMs associated with each of the business units.

4. The computing device of claim 1, wherein the master recovery plan identifies dependencies among the plurality of business units and further defines a priority associated with each of the plurality of business units, and wherein a termination sequence is defined based on the dependencies and the priorities associated with the business units, and wherein the processor is further programmed to generate the map UI by:
animating the first progress indicator to display termination of each of the plurality of business units according to the termination sequence; and
animating the second progress indicator to display initiation of each of the plurality of business units according to a reversal of the termination sequence.

5. The computing device of claim 1, wherein the master recovery plan includes a plurality of individual recovery plans, and wherein the processor is further programmed to generate the map UI by animating the first progress indicator to display performance of at least two of the individual recovery plans in parallel.

6. The computing device of claim 1, wherein the master recovery plan includes an ordered plurality of individual recovery plans, and wherein the processor is further programmed to generate the map UI by animating the first progress indicator to display performance of at least two of the individual recovery plans in sequence.

7. The computing device of claim 1, wherein the processor is further programmed to:
determine a criticality of each of the business units based on one or more performance metrics associated with the business units; and
generate the map UI by graphically distinguishing the business units based on the determined criticalities.

8. A method comprising:
detecting transfer of a plurality of VMs in a datacenter from a source site to a target site, each VM associated with a business unit of a plurality of business units; and
generating a map user interface (UI), the map UI comprising:
a first region having a first animated progress indicator illustrating termination of each of the plurality of business units at the source site, the first region corresponding to a geographic location of the source site in the map UI, and
a second region having a second animated progress indicator illustrating initiation of each of the plurality of business units at the target site, the second region corresponding to a geographic location of the target site in the map UI, the second animated progress indicator further representing a reverse animation of the first animated progress indicator,
wherein the second animated progress indicator is displayed simultaneous to display of the first animated progress indicator.

9. The method of claim 8, further comprising:
displaying, in the map UI, a directional arrow from the source site to the target site;
detecting a reversed transfer of the VMs from the target site to the source site resulting from a failover operation or a failback operation; and
reversing the direction of the directional arrow in response to the reversed transfer.

10. The method of claim 8, further comprising:
receiving user input requesting the transfer of the VMs from the source site to the target site; and
initiating the transfer based on the received user input.

11. The method of claim 8, further comprising:
receiving user input requesting detailed information regarding the detected transfer; and
displaying, in the map UI, the requested detailed information.

12. The method of claim 8, wherein generating the map UI comprises:
animating the first progress indicator to display termination of the VMs associated with each of the plurality of business units; and
animating the second progress indicator to display initiation of the VMs associated with each of the plurality of business units.

13. The method of claim 12, wherein generating the map UI further comprises grouping the VMs by business unit within the first progress indicator and within the second progress indicator.

14. The method of claim 8, wherein a termination sequence is defined based on dependencies and priorities associated with the business units, and wherein generating the map UI comprises:
animating the first progress indicator to display termination of each of the plurality of business units according to the termination sequence; and
animating the second progress indicator to display initiation of each of the plurality of business units according to a reversal of the termination sequence.

15. One or more computer-readable storage media including computer-executable instructions that, when executed during transfer of a plurality of business units in a datacenter from a source site to a target site, cause at least one processor to:
display, in a first region of a map UI, a first animated progress indicator representing termination of each of the business units at the source site, the first region corresponding to a geographic location of the source site in the map UI, each of the plurality of business units including one or more computing nodes of a plurality of computing nodes;
display, in a second region of the map UI and simultaneous to the display of the first animated progress indicator, a second animated progress indicator representing initiation of each of the plurality of business units at the target site, the second region corresponding to a geographic location of the target site in the map UI, the second animated progress indicator further representing a reverse animation of the first animated progress indicator;
receive, from the user via a search UI element associated with the map UI, a search term representing at least a portion of an identifier of a matching computing node of the plurality of computing nodes; and
in response to the received request, display, in a third region of the map UI, a current status of the matching computing node, the third region corresponding to a geographic location associated with the matching computing node.

16. The computer-readable storage media of claim 15, wherein the computer-executable instructions further cause the processor to graphically emphasize the matching computing node in the map UI.

17. The computer-readable storage media of claim 15, wherein receiving at least a portion of the identifier comprises receiving at least a portion of a name of the matching computing node.

18. The computer-readable storage media of claim 15, wherein receiving at least a portion of the identifier comprises receiving map coordinates or a street address.

19. The computer-readable storage media of claim 15, wherein the computer-executable instructions further cause the processor to display one or more weather conditions in the map UI.

20. The computer-readable storage media of claim 15, wherein the computer-executable instructions further cause the processor to display, in the map UI, a time of day corresponding to each of the first region and the second region.

* * * * *